(12) United States Patent
Vieluf

(10) Patent No.: US 6,440,543 B1
(45) Date of Patent: Aug. 27, 2002

(54) FLEXIBLE FLOORING TILE

(75) Inventor: Hans-Dieter Vieluf, Delmenhorst (DE)

(73) Assignee: DLW Aktiengesellschaft (DE)

( * ) Notice: Subject to any disclaimer, the term of this patent is extended or adjusted under 35 U.S.C. 154(b) by 0 days.

(21) Appl. No.: 09/194,110

(22) PCT Filed: May 16, 1997

(86) PCT No.: PCT/EP97/02533

§ 371 (c)(1),
(2), (4) Date: Jan. 4, 1999

(87) PCT Pub. No.: WO97/44518

PCT Pub. Date: Nov. 27, 1997

(30) Foreign Application Priority Data

May 20, 1996 (DE) .......................................... 196 20 227

(51) Int. Cl.⁷ .......................... B32B 17/00; B32B 13/02; B32B 25/02; B05D 1/00; B05D 1/36
(52) U.S. Cl. ................ 428/210; 428/294.7; 428/296.4; 427/209; 427/407.3; 427/412
(58) Field of Search ............................... 427/209, 407.1, 427/407.3, 412; 428/210, 212, 294.7, 296.4

(56) References Cited

U.S. PATENT DOCUMENTS 1,970,503 A * 8/1934 Hawkes ...................... 154/49
4,546,024 A * 10/1985 Brown ......................... 428/44

* cited by examiner

Primary Examiner—Cynthia H. Kelly
Assistant Examiner—B. Shewareged
(74) Attorney, Agent, or Firm—Womble Carlyle Sandridge & Rice, PLLC.

(57) ABSTRACT

A floorcovering tile is provided which has an upper and a lower layer and a carrier arranged between these, where at least one of the two layers is a service layer. The floorcovering tile retains its flatness even when temperature and/or humidity varies. A process for producing the floorcovering tile is also described.

6 Claims, No Drawings

FLEXIBLE FLOORING TILE

FIELD OF THE INVENTION

The present invention relates to a flexible floorcovering tile. More precisely, the present invention relates to a floorcovering tile having a carrier and layers and/or service layers arranged upon this, in particular a linoleum-based floorcovering

BACKGROUND OF THE INVENTION

Flexible floorcovering tiles are known. They may have a service or wear layer based on a synthetic polymer and the service layer may be applied on a carrier, e.g. a carrier made from a natural or synthetic fabric. Glass-fiber fabrics are likewise suitable as carriers. Textile tiles of needlefelt made from e.g. polypropylene, polyamide, polyester, polyacrylonitrile and mixtures of these are known, for example. Tufted textile tiles made from natural and/or synthetic fibers with a carrier (which may be woven and/or nonwoven) made from natural and/or synthetic fibers, where the reverse side of the tile is coated with, for example, latex, polyvinyl chloride or bitumen are also known. There are also tiles with a service layer made from natural cork on a stabilizing carrier made from a woven or nonwoven, combined with a pressure-sensitive adhesive if desired.

Flexible floorcovering tiles are usually produced by stamping out the tile in the desired size from a continuous web of the floorcovering material. The tiles are mostly square with an edge length of from about 30 to about 60 cm, but may also have other shapes and/or sizes.

Tiles having a carrier have the problem that the carrier and the service layer have different coefficients of expansion. This gives a type of "bimetal effect", i.e. change of temperature, change of humidity or other environmental influences cause the edges of the tile to curve upward ("bow") or downward. In both cases, even if the tile is adhesively bonded to the floor, the distortion causes it to lift, at least partially, from the floor. The extent to which the tile bends depends on the material of the service layer and of the carrier. When linoleum is the service layer, the distortion of the tile is particularly pronounced, since linoleum shrinks markedly following. production of the floorcovering, on cooling after the curing process in the curing room or curing hall. Since the carrier fabric does not contract, or at least not to the same extent as the service layer, this shrinkage leads to the "bowing" of the tile. In linoleum floorcovering tiles, for example, this effect can be strengthened or weakened by swelling or con-traction, caused by humidity variations in the surroundings, of the organic filler based on ground wood and/or cork which is usually present in the linoleum. Generally, however, the distorting forces do not cancel each other out, so that the tile distorts. This distortion caused by the environment is one of the most important reasons for the inability of floorcovering tiles having a service layer on a carrier, and in particular linoleum floorcovering tiles, to become established in the market.

SUMMARY OF THE INVENTION

An object of the present invention is therefore to provide a floorcovering tile in which the service layer is applied to a carrier and/or a carrier fabric and whose flat shape does not change, or at least changes significantly less than that of conventional floorcovering tiles of this type, under the influence of variations in temperature and/or atmospheric humidity and of changes in other factors in the internal environment.

This object is achieved with the articles characterized in the patent claims. The object is achieved here by the discovery that the distortion of the floorcovering tile caused by the environment can be prevented or considerably reduced by opposing the distorting force exerted by the service layer on the upper side of the carrier with a corresponding force on the underside of the carrier. According to the invention, a floorcovering tile construction is therefore proposed in which a carrier does not only have a service layer on one side, as in conventional tiles, but in which the other side of the carrier and/or carrier fabric is also coated. In the novel floorcovering tile, therefore, the carrier is not situated on one side of the service layer (sometimes called asymmetric tile construction) but is arranged between two layers, at least one of which is a service layer (sometimes called symmetrical tile construction).

The invention and its further advantages are explained in more detail in the following description, with reference to the working examples described under the headings of Examples and Comparative Examples.

DETAILED DESCRIPTION OF THE INVENTION

The novel flexible floorcovering tile has a carrier which is coated on both of its sides. At least one of the two coated layers is a service layer of the floorcovering. The other coated layer may consist of a material which is different from that of the service layer and essentially serves only to counteract the distortion force exerted by the service layer; this layer adheres, on the one hand, to a sufficient extent to the carrier and/or carrier fabric and, if desired, to the material which comes from the service layer on the other side and has penetrated into the carrier fabric, and, on the other hand, it should be capable of being adhesively bonded to the floor. Both layers of the novel floorcovering tile are preferably service layers, the binders and other components of which may be different. For reasons which are explained below, both service layers contain essentially the same coating material, e.g. linoleum, the components, such as binders, fillers, pigments, processing aids and the like being different or essentially the same and being present in the same or different amounts.

The layer thicknesses of the two layers applied to the carrier can be the same or different. In the case of layers which have formulations differing in their components, the distortion of the tile can be counteracted by varying the materials used and their quantity, and by appropriate choice of the layer thickness of the relevant layer. For example, differing expansion of the two layers because of different coefficients of expansion or reaction to humidity change can be compensated by different layer thicknesses. The type and amount of fillers, such as wood flour or ground cork, which swell or shrink when the relative humidity changes, may likewise be changed in the appropriate manner.

Each of the two layers preferably consists of essentially the same type of components in as far as possible the same amounts. In this case, both of the layers and/or service layers applied to the carrier can be produced with essentially the same layer thickness, giving the best balance of the opposing distorting forces.

The novel floorcovering tile has a total thickness of from about 2 to about 6 mm, preferably from about 2 to about 4 mm.

The carrier may be any material which has hitherto been used in floorcoverings or in floorcovering tiles and which is based on natural and/or synthetic woven or knitted fabrics or on textile materials. Examples are jute fabrics, fabrics made from a mixture of natural fibers, such as cotton and staple viscose, glass-fiber fabrics, glass-fiber fabrics coated with coupling agent, fabrics made from a mixture of synthetic fibers and fabrics made from core/sheath fibers with, for example, a core of polyester and a sheath of polyamide. As coupling agent for glass-fiber fabrics, a coating of a styrene-butadiene latex on the glass fibers may be used.

To produce the layers and/or service layers which are arranged on the carrier, any binder used in conventional floorcovering tiles may be employed.

The layers of the novel floorcovering tiles may moreover contain conventional fillers, colorants, such as organic and inorganic dyes and pigments, processing aids, antioxidants, stabilizers and other conventional additives, the choice of which depends on the binder.

For example, floorcoverings based on linoleum comprise a Bedford cement (abbreviated to B cement) made from a partially oxidized linseed oil, at least one resin as tackifier and at least one filler, such as softwood flour and/or ground cork (if wood flour and ground cork are both present, the weight ratio is typically 90:10) and/or chalk, kaolin (China clay) and barytes, and at least one pigment, such as titanium dioxide and other conventional colorants based on inorganic and organic dyes. A typical linoleum formulation consists of, based on the weight of the service layer, about 40% by weight of binder, about 30% by weight of organic fillers, about 20% by weight of inorganic (mineral) fillers and about 10% by weight of colorants.

The present invention is explained in more detail using the production and properties of a linoleum floorcovering tile.

As mentioned above, a floorcovering tile is usually produced by being stamped out of a continuous web of floorcovering which has already been produced. Continuous webs of conventional linoleum floorcoverings are produced by firstly mixing all of the components, such as binder (B cement, fillers, pigments and conventional additives, such as processing aids, antioxidants, UV stabilizers, lubricants and the like) in a suitable mixing apparatus, e.g. a compounder, roller assembly or extruder, to give a base compound (mixing compound) which is as homogeneous as possible. To produce a single-color linoleum covering, the mixing compound is fed to a roller assembly (calender) and pressed at a temperature of usually from 10 to 150° C. (depending on the formulation and the processing technique) onto a carrier as described above, mostly a jute fabric or a glass-fiber fabric coated with coupling agent. The calender nip is set so that the resultant floorcovering web is given the desired thickness.

The process may be varied by, in the first step on the roller assembly, pressing a single-color mixing compound onto the carrier fabric in only a sufficient amount to fill the interstices present in the fabric and give a continuous level surface. The carrier fabric coated in this way is then pressed in a suitable manner together with a linoleum sheet (i.e. a calendered web made from linoleum base compound without carrier fabric and produced using a different pair of rolls on the calender) to give the final floorcovering. To improve the thermal insulation properties and the solid-borne sound insulation, a corkment layer may be introduced between the (uncoated or coated) carrier and the linoleum sheet. Corkment is a mixture comprising B cement and ground cork as filler.

If a floorcovering with a colored pattern is to be produced, mixing compounds and/or base compounds of varying color are produced and granulated. Differently colored granules are then fed to the roller assembly, and pressed either directly onto the carrier fabric or onto the carrier fabric which has been precoated with single-color base compound and/or a corkment layer, giving, for example, a floorcovering with a marble-type patterning.

In contrast to floorcovering webs in which a synthetic polymer is used as binder in the service layer, a floorcovering based on linoleum is not ready for use after the calendering of the mixing compound or base compound, since linoleum at this stage has insufficient tensile and compressive strength for the remainder of the production process and for use. This is achieved only in a subsequent curing process through further crosslinking of the binder. For this, the web is transported from the calender into the curing hall or curing room and stored hanging over poles. The curing of the linoleum web, i.e. the further crosslinking to the desired degree, is brought about by warm air with a temperature of from about 40 to 100° C. over a period of time which depends on the formulation, the thickness of the service layer, the temperature and the desired degree of crosslinking and is usually from about 5 to about 50 days. The carrier material therefore serves, during the production of the linoleum floorcovering web, to support and hold the service layer until it is cured, and after that as reinforcement of the floorcovering.

Since the organic fillers, such as wood flour and/or ground cork, contained in the floorcovering give up moisture when it is curing, the floorcovering is usually conditioned after curing, i.e. it is readjusted to a moisture level which is usual in the indoor environment.

A tile stamped out from a linoleum floorcovering web of this type shows the undesired distortion (bowing) deriving from shrinkage of the service layer which is essentially attributable to the following three reasons:

1. The B cement and the fillers contained within it, such as ground cork, give the linoleum mixing compound (base compound) certain elastic properties. During calendering, the material is under pressure for a short time and during this is stretched in the nip. Once the pressure is removed, the stretched material returns, to some extent, to its original shape, i.e. it contracts.
2. The shrinkage is exacerbated by loss of material during the curing process by diffusion of volatile constituents out of the mixing compound.
3. Finally, the larger coefficient of thermal expansion of the service layer in comparison with that of the carrier causes the service layer to contract more strongly than the carrier during cooling after leaving the curing hall or the curing room.

Attempts to prevent this distortion have hitherto been without success. For example, a curing process where the floorcovering webs are laid horizontally during storage is technically complicated and moreover does not affect the distortion to any great extent. Placing clamping strips on the edges of the curing webs while they are hanging, in order to prevent the bowing which is at its most pronounced at the edges, is likewise technically complicated, is also expensive, and gives only a slight improvement in the dimensional stability, without resolving the essence of the problem. These and similar attempts, such as the use of different carrier materials, were not suitable for giving the tiles a flat shape and holding them in this shape.

Novel linoleum floorcovering tiles according to the present invention are therefore produced as follows:

At least one further layer is calendered onto the other side of a carrier fabric which has been coated on one side in a conventional manner (either by roller-application of a mixing compound or a linoleum sheet onto the carrier fabric or onto an already coated carrier fabric, having an additional corkment layer, if desired ).

The carrier can be any conventional carrier, for example a jute fabric. However, according to the invention, it is preferable to use a glass-fiber fabric, for example coated with a styrene-butadiene latex as coupling agent, since the layer which is to be applied to the reverse side of the carrier adheres better to the coated glass-fiber fabric than to jute. The reason for this is that the layer on the reverse side is no longer able to penetrate the voids in the fabric, since these voids have already been filled by the firstly applied layer, and therefore the adhesion is not underpinned by any mechanical anchoring of the second layer onto the carrier.

As already mentioned, the layer applied onto the reverse side of the carrier can consist of a material other than linoleum. Care should be taken in all cases that the expansions of the two layers under the influence of temperature and humidity, which result from the types of components used, their amounts and the layer thickness of each layer, are as nearly as possible the same.

Both layers preferably consist of linoleum and even more preferably of linoleum of essentially the same formulation.

This has the advantage that, when the layer thickness is almost the same and the formulation is almost identical, the opposing distortion forces of the two layers cancel each other out.

A further advantage is the possibility of giving the two layers different colors or providing them with a different pattern, the formulation being otherwise the same. In this way it is possible to combine both sides of the tile with each other as desired without the risk that the laid floor will have areas of differing thickness attributable to layer thickness tolerances in differently colored tiles from different production batches.

Finally, it is advantageous on environmental grounds that the tile has service layers whose, binders are based solely on raw materials from natural sources.

EXAMPLES

The present invention is illustrated in further detail by means of the following examples and comparative examples. For assessment of dimensional stability, the floorcovering tiles produced in the examples and comparative examples are stored for 48 hours under standard conditions of temperature and humidity (23° C.; 50% relative humidity). The shape is then assessed visually.

Example 1

The following components for a linoleum mixing compound are premixed with one another in a compounder:
- 40 parts by weight of B cement;
- 30 parts by weight of a mixture of softwood flour and ground cork in a weight ratio of 90:10;
- 20 parts by weight of chalk; and
- 10 parts by weight of titanium dioxide.

This single-color (white) mixing compound is pressed onto the first side of a jute fabric in a layer thickness of 1 mm, using a calender. The carrier coated in this way is covered on its reverse side with a 1 mm thick linoleum sheet produced from the mixing compound as described above, and pressed together with this in a further calender. Floorcovering tiles having a total thickness of 2 mm and a size of 30·30 cm and 50·50 cm are stamped out of the resultant floorcovering web, after it has cured in the curing hall and received any conditioning which may be necessary after the cooling. The tiles have two service layers, each 1 mm thick, and a carrier arranged between these. The tiles are stored for 48 hours under standard conditions of temperature and humidity. The result of the visual assessment was that none of the tiles had the bowing which is observed in conventional linoleum floorcovering tiles.

Example 2

Example 1 was repeated, with the difference that each of the service layers was 2 mm thick, giving tiles with a total thickness of 4 mm. The tiles showed no distortion after storage under standard conditions of temperature and humidity for 48 hours.

Example 3

Examples 1 and 2 were repeated, with the difference that a glass-fiber fabric which had been coated with a styrene-butadiene latex as coupling agent was used as carrier instead of the jute fabric.

None of the resultant tiles showed distortion after storage under standard conditions of temperature and humidity for 48 hours.

Comparative Example 1

A floorcovering tile is produced in the same manner as described in Example 1, but, as is conventional, only one side of the jute fabric is coated with a 1 mm thick layer of mixing compound. The resultant floorcovering tile with a total thickness of 1 mm showed distinct bowing after storage under standard conditions of temperature and humidity for 48 hours.

Comparative Example 2

Comparative Example 1 was repeated, the service layer applied onto only one side of the carrier having a thickness of 2 mm. The resultant floorcovering tile had a still more pronounced bowing after storage under standard conditions of temperature and humidity for 48 hours than the tile of Comparative Example 1.

Comparative Example 3

Comparative Example 2 was repeated, with the difference that the glass-fiber fabric of Example 3 was used instead of the jute fabric. The resultant floorcovering tiles likewise showed distinct bowing after storage under standard conditions of temperature and humidity for 48 hours.

What is claimed is:

1. A flexible floor tile comprising:
   - at least one upper linoleum wear layer;
   - at least one lower linoleum wear layer;
   - a backing bonded between said at least one upper linoleum wear layer and said at least one lower linoleum wear layer; and
   - at least one further layer between said backing and at least one of said wear layers.

2. A flexible floor tile according to claim 1, wherein said at least one further layer is an insulating layer.

3. A method for the manufacture of a flexible floor tile having at least one upper and at least one lower linoleum wear layer and a backing arranged between the wear layers, said method comprising the steps of:

preparing an uncoated or coated backing web;

applying at least one further layer to at least one side of said backing web;

coating one side of said backing web with at least one upper wear layer formed from a linoleum mixture mass;

subsequently coating the other side of said backing web with at least one lower wear layer formed from a linoleum mixture mass to produce a floor covering web;

conveying said floor covering web into a curing chamber for curing of said floor covering web;

curing said floor covering web;

cooling said floor covering web;

conditioning said floor covering web to set the moisture content thereof; and stamping said flexible floor tile from said floor covering web.

4. The method according to claim 3, wherein said backing web is a jute fabric.

5. The method according to claim 3, wherein said backing web is a glass-fiber fabric wherein said fibers are coated with an adhesion-promoting agent.

6. The method according to claim 5, wherein said further layer is an insulating layer.

* * * * *